UNITED STATES PATENT OFFICE.

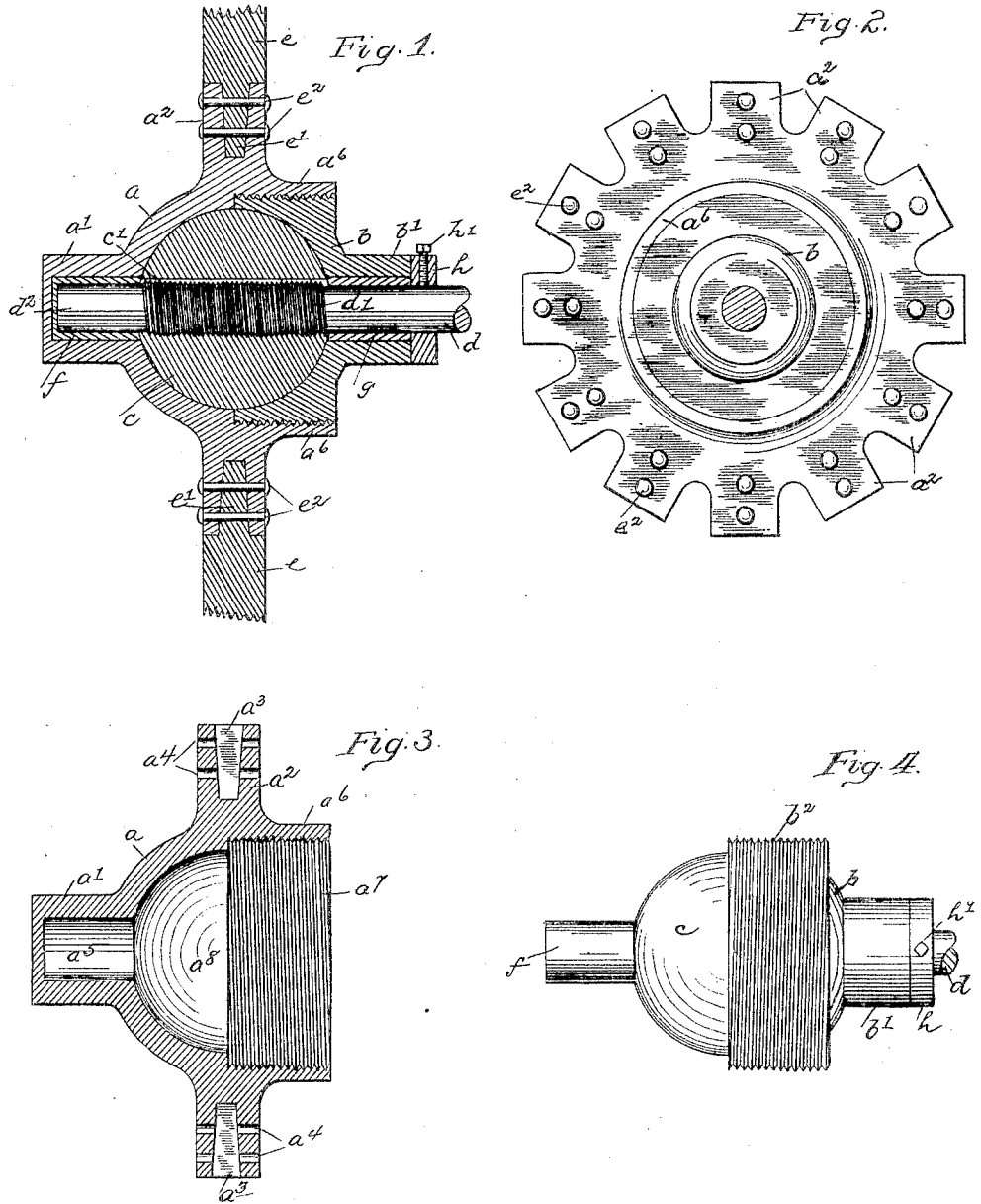

ERNEST HENRY LAMPE, OF STEVENS POINT, WISCONSIN.

HUB.

No. 797,127.      Specification of Letters Patent.      Patented Aug. 15, 1905.

Application filed July 7, 1904. Serial No. 215,652.

*To all whom it may concern:*

Be it known that I, ERNEST HENRY LAMPE, a citizen of the United States, residing at Stevens Point, in the county of Portage and State of Wisconsin, have invented certain new and useful Improvements in Hubs, of which the following is a specification.

My invention relates to improvements in hubs for wheels, and the especial object of said improvements is to provide a hub that can be economically manufactured, that will be ball-bearing, easily-lubricated, dust-proof, durable, in which the wear can be compensated for, and which will be free from vibration, so that it is especially adapted for use as in wheels for automobiles and other heavy vehicles where there is unusual strain and jar on the wheels.

Having the aforegoing and other objects of general utility in view, I have designed the hub hereinafter described in detail and which is fully illustrated in a preferred form in the accompanying drawings, which form a part of this application, and in which—

Figure 1 is a vertical section taken through my improved hub and showing its attachment to an axle. Fig. 2 is an elevational view of said hub, taken from the inner side of the wheel. Fig. 3 is a vertical section through the outer or main hub-shell, and Fig. 4 is a view in elevation of the inner hub-shell and other parts adapted to fit within the shell shown in Fig. 3.

Referring to the drawings in detail, $a$ represents the rounded or semispherical portion of the outer shell; $a'$, a hub extension formed with a cylindrical socket or recess $a^5$.

$a^2$ represents radial extensions each of which is formed with a recess $a^3$, adapted to receive the extension $e'$ of the spokes $e$, and extending transversely therethrough are rivet-holes $a^4$.

$a^6$ is a hub extension on the inner side of the sheel $a$, which is internally threaded, as at $a^7$, and $a^8$ is a semispherical chamber in the inside of the shell, all of said parts being formed in an integral casting or unitary structure.

$b$ represents the inner portion of the hub that is complementary to the part $a$, and the same is formed with an extension provided with external threads $b^2$, which are adapted to engage the female threads $a^7$ of the portion $a^6$ of the outer shell. The portion $b$ is formed with an internal semispherical chamber which, with the corresponding chamber $a^8$ in the shell $a$, forms a socket or seat for the sphere or ball $c$. This sphere is bored with a left-hand female thread $c'$, into which is screwed the correspondingly male-threaded portion $d'$ of the axle $d$.

In the recess $a^5$, formed in the shell $a$, is inserted a cap $f$, preferably made of brass or of any suitable metal, which is adapted to receive and furnish a bearing for the outer end $d^2$ of the shaft $d$, and through a suitable opening in the center of the hub-shell $b$ is inserted a sleeve $g$, also of brass or other suitable metal, which furnishes a further bearing for the axle.

When the parts above described are assembled in the manner set forth on an axle $d$, they are locked in place by a ring $h$, which is provided with a set-screw $h'$, which fixes it on the axle, thus holding the sleeve $g$ in place and preventing the shell $b$ from being unscrewed from the shell $a$.

The sphere or ball $c$ is preferably made of brass or other suitable antifrictional metal, and the bearings $f$ and $g$ for the axle $d$ may be equipped with lubricating devices or means, the same being no necessary part of my invention, and hence are not shown in this connection.

The threads on the axle and ball, as well as on the shells $a$ and $b$, are cut so that the parts will not be unscrewed by the normal rotation of the wheel or hub around the ball and axle.

It will be apparent that the construction and arrangement above described are applicable to pulleys and shafts as well as to wheels and axles, and I therefore do not limit myself in this application to said construction as applied exclusively to wheels; but

What I claim as new, and desire to obtain by Letters Patent, is—

1. In a wheel, a hub composed of two interfitting shells each provided with a semispherical chamber, and one of said shells provided with a recess adapted to receive the outer end of an axle, and also provided with radial spoke-sockets, the other shell provided with a passage for an axle, in combination with an axle and a ball adapted to lie in the chamber formed by said shells and secured on said axle.

2. In a hub, a shell-section formed with a semispherical chamber, and a cylindrical recess communicating with said chamber, and having an internally-threaded portion substantially as described, a complementary shell-section formed with a semispherical chamber adapted to register with the corresponding chamber of the first-named shell, and provided with a threaded portion adapted to engage the threaded portion of the first-named shell, and also provided with an opening for an axle, bearing-boxes arranged respectively in the recess in the first-named shell and in the opening in the second-named shell, and an axle arranged in said bearing-boxes, a ball secured on said axle and means for locking said axle against longitudinal movement in said shells.

3. In a wheel, a hub composed of two interfitting parts adapted to be secured together, each of said parts formed with a semispherical internal chamber, and one of said parts having a spindle-bearing therein, a metal sphere arranged in said chambers and provided with a threaded bore therethrough, in combination with an axle-spindle having a threaded portion engaging the threaded bore of said sphere.

4. In a wheel, a hub composed of two parts adapted to be secured together each of said parts formed with a semispherical internal chamber and one of said parts having a spindle-bearing therein, a sphere of antifrictional metal arranged in said chambers and forming a bearing for said hub parts, in combination with an axle-spindle secured to said sphere and journaled in said spindle-bearing, and means for preventing longitudinal movement of the hub on the spindle.

In testimony whereof I affix my signature in presence of witnesses.

ERNEST HENRY LAMPE.

Witnesses:
GEO. OERTEL,
G. L. PARK,
W. C. KREMBS.